United States Patent [19]

Custer

[11] Patent Number: 5,079,943
[45] Date of Patent: * Jan. 14, 1992

[54] METHOD OF CALIBRATING A VOLUMETRIC FLUID FLOW SENSOR

[75] Inventor: Craig S. Custer, Pompano Beach, Fla.

[73] Assignee: CTE Chem Tec Equipment Co. Inc., Deerfield Beach, Fla.

[*] Notice: The portion of the term of this patent subsequent to Mar. 6, 2007 has been disclaimed.

[21] Appl. No.: 325,959

[22] Filed: Mar. 20, 1989

Related U.S. Application Data

[63] Continuation-in-part of Ser. No. 152,736, Feb. 5, 1988, Pat. No. 4,905,844.

[51] Int. Cl.$^5$ .......................... G01F 25/00; G01F 1/22
[52] U.S. Cl. ......................................... 73/3; 73/861.53
[58] Field of Search ............ 73/861.53, 861.54, 861.55, 73/861.57, 861.58, 861.71, 3

[56] References Cited

U.S. PATENT DOCUMENTS

| | | | |
|---|---|---|---|
| 2,581,588 | 1/1952 | Greene | 73/861.53 |
| 3,234,790 | 2/1966 | Ekstrom | 73/861.58 |
| 3,759,099 | 9/1973 | McGregor | 73/861.53 |
| 4,064,751 | 12/1977 | Deisenroth et al. | 73/861.53 |
| 4,227,409 | 10/1980 | Bingler | 73/861.71 |
| 4,389,901 | 6/1983 | Lake | 73/861.58 |
| 4,507,976 | 4/1985 | Banko | 73/DIG. 3 X |
| 4,569,233 | 2/1986 | Rosaen | 73/861.71 X |

Primary Examiner—Herbert Goldstein
Attorney, Agent, or Firm—M. K. Silverman

[57] ABSTRACT

A method is disclosed calibrating a volumetric fluid flow sensor having a pole magnet armature in which a direction of reciprocation of the armature is co-linear with a magnetic axis thereof and in which there is provide a magnetic field sensor for sensing the position and strength of the magnetic axis of the magnetic armature. A path of fluid flow is defined which includes an inlet channel for contaning the reciprocation of the magnetic armature and having an outlet channel radially oriented relative to the input channel and in fluid communication with the inlet channel. A calibration magnet, located co-axially with the armature magnet provides a repulsive force to the armature magnet which, in co-action with the fluid force of the measured volumetric fluid flow provided an adjustable point of equilibrium of the armature and thereby an adjustable actuation point thereof. Different ranges of sensitivity are achieved through adjusting certain variables to thereby change the point of actuation between the magnetic and fluid forces.

22 Claims, 1 Drawing Sheet

U.S. Patent
Jan. 14, 1992
5,079,943
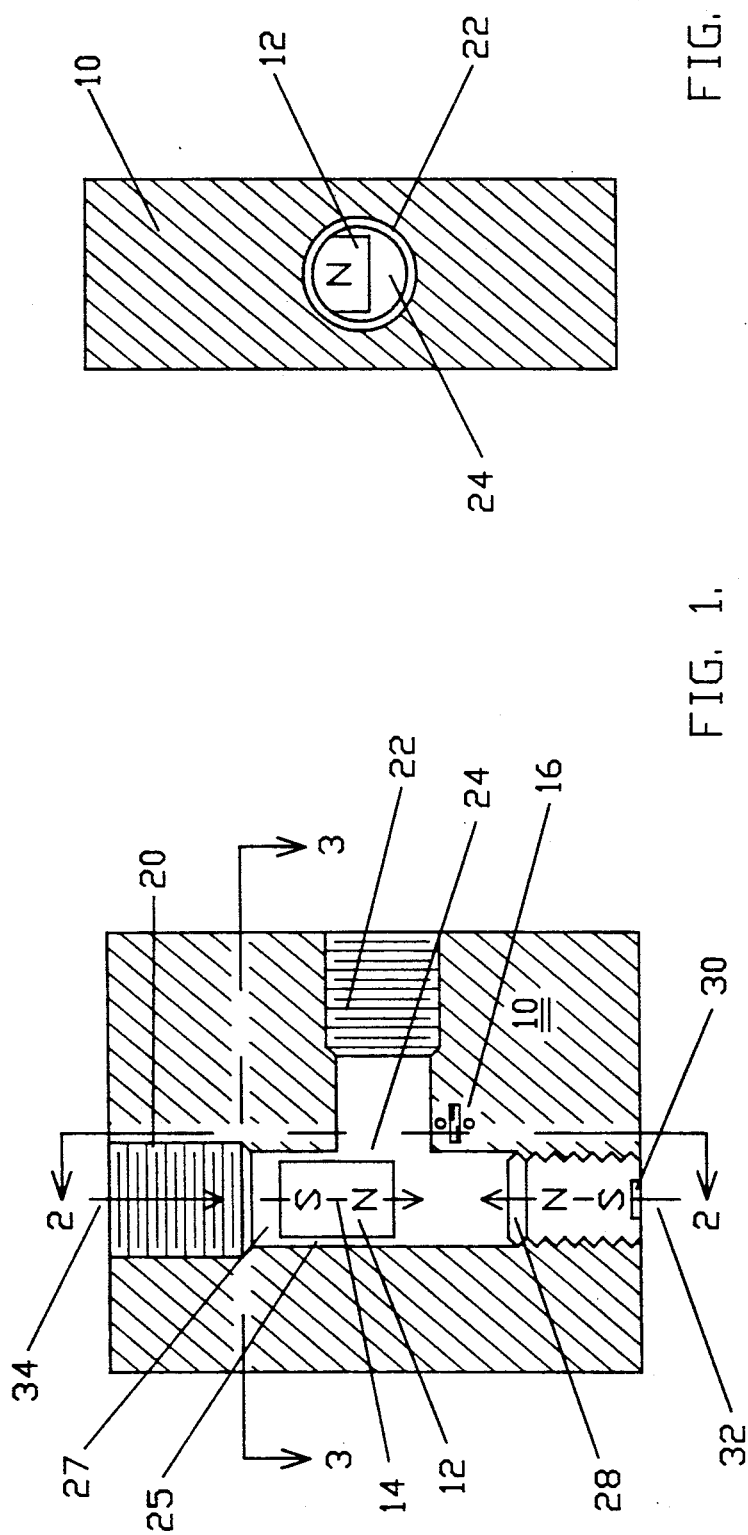
FIG. 1.
FIG. 2.
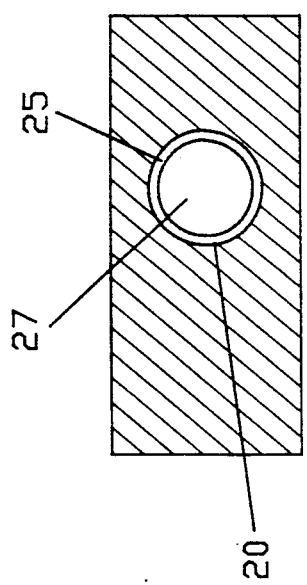
FIG. 3.

METHOD OF CALIBRATING A VOLUMETRIC FLUID FLOW SENSOR

REFERENCE TO RELATED APPLICATION

This case is a continuation-in-part of application Ser. No. 07/152,736, filed Feb. 5, 1988, entitled Method for Monitoring Ranges of Volumetric Fluid Flow, now U.S. Pat. No. 4,905,844.

BACKGROUND OF THE INVENTION

The instant invention is concerned with a method of calibrating a volumetric fluid flow sensor of a type having a pole magnet armature in which the direction of reciprocation of the armature is co-linear with the magnetic axis thereof. Such a system is further provided with a magnetic field sensor which is in magnetic communication with said magnetic axis. Changes in the field strength of said magnetic axis in the vicinity of said field sensor are monitored to thereby provide an electrical signal which is proportional to changes in volumetric fluid flow passing through an inlet channel and annularly about the pole magnet armature and to an outlet channel of the system.

The prior art includes U.S. Pat. No. 3,759,099 (1973) to McGregor, entitled Flow Meter; and U.S. Pat. No. 4,507,976 (1975) to Banko, entitled Flow Meter with Hall Effect Sensor and Method. However these, and other art known to the inventor, do not involve the use of a magnetic field sensor to measure changes in magnetic flux density of the magnetic axis of the magnetic armature in combination with the control of certain other system variables, these variables including the cross-section of a fluid interface between the fluid inlet channel and fluid outlet channel, modification of the cross-sectional geometry of one or more portions of the path of fluid flow from said inlet to said outlet channel; modification of the geometry, mass or magnetic flux characteristic of the pole magnet armature; or change in the axial location, relative to the axis of the pole magnet armature, of a calibration magnet. Change of any of the variables will affect the actuating characteristic of the armature and thereby of the sensor system.

While my above referenced co-pending application is directed to a selective modification and control of the cross-section or fluid interface between the inlet channel and fluid outlet channel, the present invention enlarges upon said method by setting forth a method by which other system variables of the volumetric fluid flow sensor may be modified to effect desired changes in the actuating characteristic, that is, of the available flux lines that will be monitored by said magnetic field sensor.

The underlying importance of the present method resides in the provision of an efficient and economical method for effecting changes in ranges of volumetric fluid flow measurements which, heretofore, could only be achieved through the use of more complex equipment and more time consuming methods, both involving substantially greater cost than is the case in fluid flow sensors embodying the inventive method described herein.

SUMMARY OF THE INVENTION

The present invention relates to a method of calibrating a volumetric fluid flow sensor having a pole magnet armature in which the direction of reciprocation of the armature is co-linear with the magnetic axis thereof and, further, including a magnetic field sensor, within magnetic communication with said magnetic axis for monitoring changes in the magnetic field strength of said magnetic axis. The method comprises the step of defining a path of fluid flow including an inlet channel having a magnetic armature axially positioned therein and having an outlet channel radially oriented relative to the axis of said input channel and in fluid communication with said input channel; and employing an axially positioned calibration magnet having a magnetic axis in repulsive relationship to the magnetic axis of the armature and located co-linearly with said magnetic axis of said armature, to thereby define a point of equilibrium between the force of magnetic repulsion between said magnetic axes of said calibration magnet and of said armature, and a fluid force applied against an inlet channel side of said armature by the volumetric fluid flow measured by said fluid flow sensor.

The inventive method may also include one or more of the steps of selectable modifying the cross-sectional geometry of one or more portions of said path of fluid flow; and of selectively modifying the geometry, mass, or magnetic flux characteristic of said pole magnet and/or said axially located calibration magnet. The use of any one of said variables will affect the actuating characteristic of the armature, affect the actuating characteristic of the armature and, thereby, the concentration of the magnetic flux lines which are sensed by said magnetic field sensor. The sensitivity of the volumetric fluid flow sensor across a particular range of fluid flow values may thereby be calibrated.

It is, accordingly, an object of the present invention to provide a method of calibrating ranges of volumetric fluid flow that may be monitored by a volumetric fluid flow sensor.

It is, accordingly, an object of the present invention to provide a method of calibrating ranges of volumetric fluid flow that may be monitored by a volumetric fluid flow sensor.

It is another object of the present invention to provide a simple and economic method of calibrating and re-calibrating volumetric fluid flow sensors which make use of a pole magnet armature and an associated magnetic sensor.

The above and yet other advantages of the present invention will become apparent in the hereinafter set forth Detailed Description of the Invention, the Drawings and Claims appended herewith.

BRIEF DESCRIPTION OF THE DRAWINGS

FIG. 1 is a diametric cross-sectional view of a sensor to which the inventive method may be applied.

FIG. 2 is a radial cross-sectional view taken along the radius of the outlet channel of the system and taken along Line 2—2 of FIG. 1.

FIG. 3 is a radial cross-sectional view taken along the radius of the inlet channel and taken along Line 3—3 of FIG. 1.

DETAILED DESCRIPTION OF THE INVENTION

With reference to FIG. 1, there is shown a sensor housing 10 having therein a pole magnet armature 12. This armature includes a magnetic axis 14 which is defined by the indicated north pole and south pole of said armature 12. Said armature is slidably positioned within inlet channel 20, as is further described below.

Also shown in FIG. 1 is magnetic field sensor 16 which is located within magnetic communication of said magnetic axis 14 of said armature 12. As may be appreciated, the closer that magnetic field sensor 16 is to axis 14, the greater will be the concentration of magnetic flux lines at the field sensor. Accordingly, it is advantageous to position sensor 16 as close to channel 20 as possible.

With reference to FIGS. 1, 2 and 3, the sensor housing 10 may be seen to include said inlet channel 20, an outlet channel 22, and a fluid interface 24 which represents a plane of intersection between said inlet and output channels. A fluid force 31, will be applied against lower surface 27 of armature 12 by the volumetric flow measured by the fluid flow sensor.

As may be further noted, said pole magnet armature 12 floats within inlet channel 20, and is separated from the wall thereof by an axial annular region 25. It is, accordingly, through the region 25 that fluid from inlet channel 20 is able to reach fluid interface 24 and outlet channel 22.

In volumetric fluid flow sensors of the instant type, the range of sensitivity of the system is directly proportional to movement or changes in magnetic flux lines which are sensed by said magnetic field sensor 16. Accordingly, by calibration or adjustment of the point of actuation, i.e., of upward movement (with reference to the view of FIG. 1) or armature 12, the fluid flow range that the field sensor 16 is capable of measuring can thereby be varied. In other words, the greater the amount of fluid force 34 that is felt across lower surface 27 of armature 12 without appreciable upward movement of magnetic axis 14, the higher will be the operating range of fluid flows sensed by the system. Conversely, the smaller is the force against lower surface 27 (and its effective radial cross-section) needed for armature actuation, the lower will be the volumetric fluid flow that the system can monitor.

Analogously, the cross-sectional geometry of one or more portions of inlet channel 20 and outlet channel 22 may be modified to produce the same type of change in sensitivity as is the case in varying the cross-sectional geometry of armature 12. Further, it is to be appreciated that the mass and/or magnetic characteristic of armature 12 may also be varied to change the equilibrium point between the downwardly pointing force of repulsion between magnetic axis 14 and magnetic axis 32 of calibration magnetic 30, on the one hand, and the upward fluid force 34 applied against said surface 27 of armature 12. Accordingly, the function of magnetic field sensor 16 may be viewed as that of monitoring changes in the point of equilibrium between said downwardly pointing force of magnetic repulsion and said upwardly pointing force of fluid flow against said surface 27 of armature 12. In general, the inventive method herein is one of selectively changing said point of equilibrium.

It is, accordingly, to be appreciated that said point of equilibrium (also referred to as the point of actuation of armature 12) may also be modified through changing the magnetic position or strength of magnetic axis 32 of calibration magnet 30 by, for example, advancing magnet 30 into region 28.

The further utility of the present method is to assure that the point of equilibrium will fall within a physical point along said magnetic axes 14 and 32 which will be within suitable magnetic communication of magnetic field sensor 16 to, thereby, ensure a maximum reliability of the present system.

Resultingly, it has been found that through the use of the above described variables, one need only employ a small axial length of displacement above the region of the north pole of armature 12 in order to measure rather large ranges of volumetric fluid flow and, as well, to compensate for nonlinearity which would otherwise occur when armature 12 is moved too far away from magnetic field sensor 16.

It is to be appreciated that through use of the variables of axial position of the calibration magnet 30, change in cross-sectional geometry, mass, or magnetic flux characteristic of armature 12, and change in cross-sectional geometry of one or more portions of the fluid flow path from the inlet to outlet channel, one may create volumetric flow sensors which are responsive to both many different ranges of volumetric flow and, where desired, to very small changes within such different ranges.

A preferred embodiment of said magnet field sensor 16, comprises a Hall-effect semiconductor, this being a semiconductor which in the gating function thereof is affected by the concentration of magnetic flux lines thereat. It is, however, to be appreciated other types of magnetic sensors may be employed within the practice of the instant method.

While there has been showed and described the preferred embodiment of the present invention, it is to be appreciated that the invention may be embodied otherwise than is herein illustrated described and that within said embodiment, certain changes may be made in the details of construction, and in the form and arrangement of the parts without departing from the underlying idea or principles of this invention within the scope of the claims appended herewith.

Having thus described my invention, what I claim as new, useful and non-obvious and, accordingly, secure by Letters Patent by the United States is:

1. A method of calibrating a volumetric fluid flow sensor having a pole magnet armature in which a direction of reciprocation of the armature is colinear with the magnetic axis thereof, the sensor further including a magnetic field sensor, within magnetic communication with said magnetic axis, for monitoring changes in the magnetic field strength of said magnetic axis, the method comprising the steps of:
 (a) defining a path of fluid flow including an inlet channel having said magnetic armature axially positioned therein, and having an outlet channel radially oriented relative to the axis of said input channel, and in fluid communication with said input channel; and
 (b) employing an axially positioned calibration magnet having a magnetic axis in repulsive relationship to the magnetic axis of said armature, and located co-linearly with said magnetic axis of said armature to thereby define a point of equilibrium between the a force of magnetic repulsion between said magnetic axes of said calibration magnet and of said armature, and a fluid force applied against an inlet channel side of said armature by the volumetric fluid flow measured by the fluid flow sensor.

2. The method as recited in claim 1 in which said employing step comprises the step of: employing an axially located calibration magnet located along the magnetic axis of said armature such that the actuation point of said armature may be calibrated by effecting changes in the axial distance between opposing poles of said magnetic armature and said co-axial calibration magnet.

3. The method as recited in claim 1, further comprising:
the step of modifying the geometry of one or more portions of said path of fluid flow.

4. The method as recited in claim 2 further comprising:
the step of modifying the geometry of one or more portions of said path of fluid flow.

5. The method as recited in claim 1:
further comprising the step of modifying the geometry of said magnetic armature to thereby effect the actuation point thereof.

6. The method as recited in claim 2 further comprises the step of modifying the geometry of said magnetic armature to thereby affect the actuation point.

7. The method as recited in claim 1:
further comprises the step of modifying the mass of said magnetic armature to thereby effect the actuation point thereof.

8. The method as recited in claim 2:
further comprises the step of modifying the mass of said magnetic armature to thereby affect the actuation point thereof.

9. The method as recited in claim 1:
further comprising the step of modifying the magnetic flux characteristic of said armature to thereby affect the actuation point thereof.

10. The method as recited in claim 2:
further comprising the step of modifying the magnetic flux characteristic of said magnetic armature to thereby affect the actuation point thereof.

11. The method as recited in claim 3:
further comprising the step of modifying the geometry of said armature to thereby affect the actuation point thereof.

12. The method as recited in claim 3:
further comprising the step of modifying the mass of said armature to thereby effect the actuation point thereof.

13. The method as recited in claim 3:
further comprises the step of modifying the flux characteristic of said magnetic armature to thereby affect the actuation point thereof.

14. A method of calibrating a volumetric fluid flow sensor having a pole magnet armature in which the direction of reciprocation of the armature is co-linear with the magnetic axis thereof, and further having a magnetic field sensor within magnetic communication of said magnetic armature for monitoring changes in the strength of said magnetic axis, the method comprising the step of:
(a) defining a path of fluid flow including an inlet channel having said magnetic armature axially positioned therein, and having an outlet channel radially oriented relative to said input channel and in fluid communication with said input channel;
(b) selectably modifying the cross-sectional geometry of one or more portions of said path; and
(c) employing an axially positioned calibration magnet having a magnet axis in repulsive relationship to said magnetic axis of said armature to thereby define a point of substantial equilibrium between a force of magnetic repulsion between said magnetic axis of said calibration magnet and said armature, on the one hand, and the counter-vailing force of gravity on the other hand.

15. The method as recited in claim 14 further comprising the step of:
modifying the geometry of said armature to thereby effect the actuation point thereof.

16. The method as recited in claim 14 comprising the step of:
modifying the mass of said armature to thereby affect the actuation point thereof.

17. The method as recited in claim 14 further comprising the step of:
modifying the flux characteristic of said magnet armature to thereby effect actuation point thereof.

18. The method as recited in claim 17 which said step of selectably modifying comprises the step of:
modifying the geometry of said inlet channel of said fluid path.

19. The method as recited in claim 18 in which said step of selectably modifying comprises the step of:
selectably changing the cross-sectional geometry of the armature containing portion of said input channel.

20. The method as recited in claim 17 which said step of selectably modifying comprises the step of:
changing the cross-sectional geometry of said outlet channel of said path.

21. The method as recited in claim 20 further comprises the step of modifying the geometry of said magnetic armature.

22. The method as recited in claim 20 further comprises the step of modifying the mass of said magnetic armature.

* * * * *